March 6, 1928. 1,661,596
J. J. BURKE
BOOK CASING-IN MACHINE
Filed Jan. 12, 1926
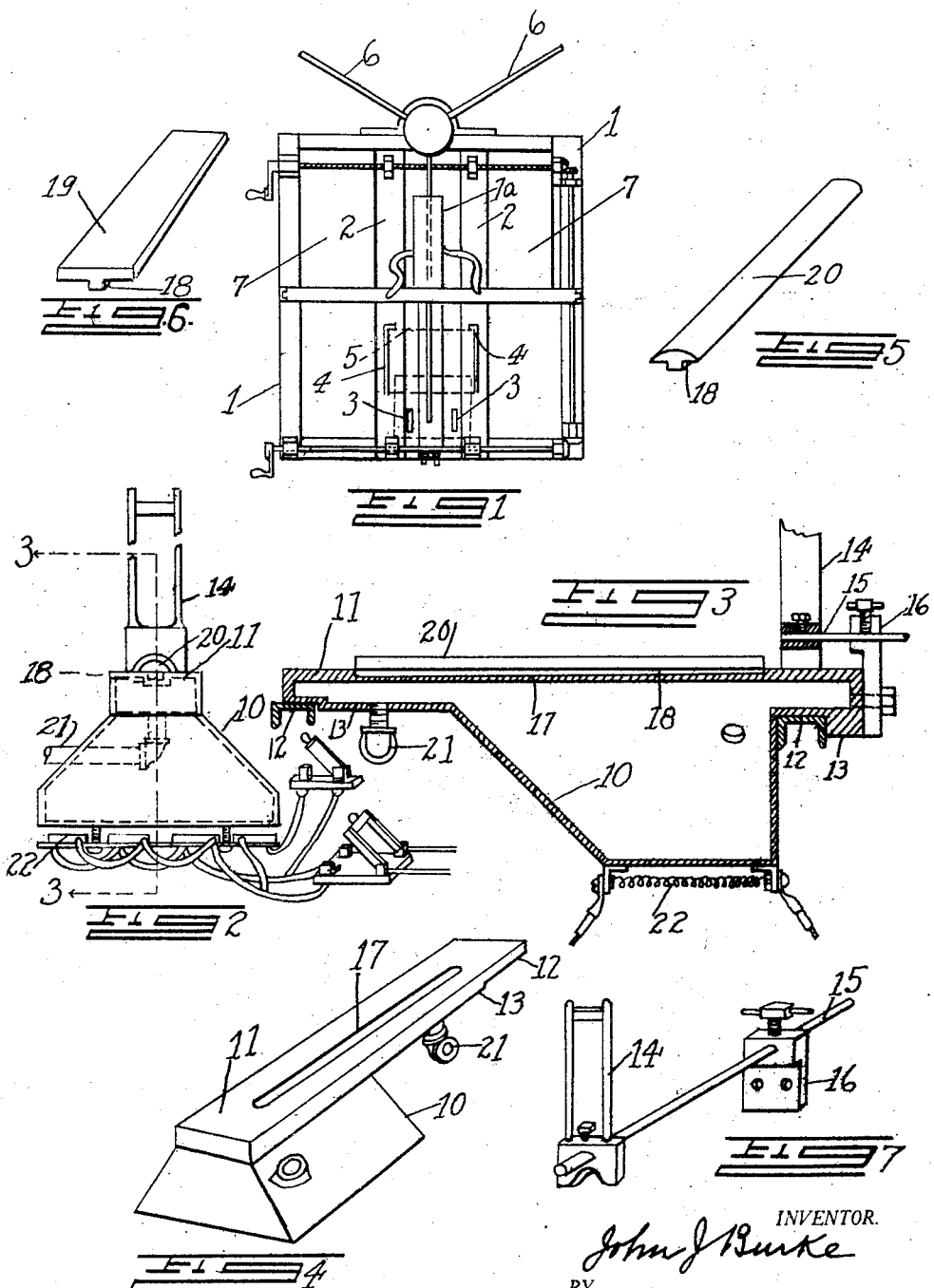
INVENTOR.
John J Burke
BY
Allen & Allen
ATTORNEYS Patented Mar. 6, 1928.

1,661,596

UNITED STATES PATENT OFFICE.

JOHN J. BURKE, OF CINCINNATI, OHIO.

BOOK-CASING-IN MACHINE.

Application filed January 12, 1926. Serial No. 80,309.

My invention relates to devices for use with machines which apply the cover or casing to books, same being called casing-in machines in the art.

The object of my invention is to provide a device on which the casings of books rest prior to being fed and clamped around the pasted back of a book, which device keeps the casings warm and pliable at the middle joint, and also forms the middle joint in the desired shape of the back of the book.

There have been devices intended for the purpose of forming the backs of the casings, and feeding them hot to the casing-in mechanism, but these have not been a success in most lines of work because of the nature of the heat applied.

Most materials from which the casings of books are made are liable to be ruined by excessive heat, and the essential improvement of my invention is to provide a device which supplies the correct forming element, at the correct temperature to give exactly the correct effect, and without danger to the types of materials used in the casing of books.

I accomplish my objects by that certain construction and arrangement of parts to be hereinafter more specifically pointed out and claimed.

In the drawing:

Figure 1 is a plan view of some parts of a typical casing-in machine.

Figure 2 is a front end elevation of the backing heating unit.

Figure 3 is a section on the line 3—3 of Figure 2.

Figure 4 is a perspective view of the heater unit.

Figure 5 is a perspective view of the forming iron for round backs.

Figure 6 is a perspective view of the forming iron for square backs.

Figure 7 is a perspective view of a spacer unit for different sized backs.

Since my device is an attachment to casing-in machines, it will not be necessary to describe or illustrate the operation of such machines.

I have illustrated a machine having a frame 1, with two laterally movable bars 2, and push fingers 3, 3, one set on each bar. Side rests 4 for a pile of book casings (illustrated in dotted lines at 5) are arranged on the bars 2, and the push fingers pass toward the devices for applying the casings to the books.

Such devices are illustrated by the spider bars 6, over which a book is set by the operator, and pasting devices illustrated at 7, which come in around the book and hold it while pasting against it, and pressing devices indicated at 7ª for wiping in the casing on the book.

It will be understood that the fingers push a casing off the bottom of the pile, so that it comes over a book lying back upward on one of the arms. The arms move for the pasting operation, then the casing is projected over the book, and finally pressers come down around the casing, which folds down over the book, and after a short pressing period, is permanently attached thereto.

The spider then swings around to present a new book, and the cased book is removed. The operation of the fingers is timed with the operation of the pressing devices and spider arms.

My device is intended to serve as the support along the median line of a pile of book casings, and the bars 2 are adjusted to support the sides of the cases.

Referring more specifically to my device, it is formed of a cast hollow tank, having a water receptacle 10, and a rectangular projecting upper portion 11, serving as a book rest. At the two ends the upper portion is provided with stepped portions 12 and 13, to rest over the frame bars of the machine, and a stack holding element 14 is set over an adjustable rod 15, held in the casting 16 that secures the one end of the tank to the frame.

The top of the rectangular portion is formed with a depression 17 forming a channel lengthwise thereof, which channel will lie beneath the backs of the pile of casings. Bars having ribs 18 to fit into the channel, and tops 19 or 20 according to the shaping of the book to which the back is to be applied, are provided and are set into the channel, thus serving as a lengthwise abutment against which the pile of cases rest along the median line thereof.

An exhaust pipe 21 extends from the inner end of the tank portion 11, thereby keeping down the steam pressure, and maintaining a temperature practically that of boiling water, in the top of the tank. This temperature will not injure the casing of a book, but will keep it soft and pliable. Also at this temperature the lowermost of a pile of books will have its back formed in the shape of the top 19, 20, or whatever shape is desired, so that when projected into the book, for pressing, or casing-in as it is called, the proper shape will be present, and the casing will fold evenly down around the sides of the book, and center itself accurately thereon.

For heating I have applied a series of electrical heating units. They are applied externally of the tank, at the bottom thereof, in any desired manner, and preferably I have three units 22, on one circuit, and a fourth, on another branch circuit, so that the amount of heat can be controlled and some excessive heat, i. e., some extra steam pressure, be built up in the tank when applying casings which require it.

My device forms the case, and heats it safely, and is readily applied in the place of the usual hot or cold table of a casing-in machine. It is very simple and quite safe in the hands of the usual operator, and saves considerable work, and assures a better casing for the book.

The method of mounting the device in the machine is, of course, incidental to the type of machine used, and it is intended that the mounting devices be made to accommodate whatever machine the attachment is to be used with. Thus I have not shown in detail the mounting devices and the various members of the machine with which the device is correlated.

The attachment herein above described is particularly applicable for book casing-in machines such as the Smythe casing-in machine which is well known in the art and which is described in the Smythe Patent No. 679,401 of July 30, 1901. The invention as will be noted from the following claims, relates only to the hollow vessel with the novel means for heating same.

Having thus described my invention, what I claim as new and desire to secure by Letters Patent, is:—

1. An attachment for casing-in machines comprising a support for the median line of a pile of book casings forming means on said support to form the backs of the casings into the desired shape for application to a book, a water vessel supported with relation to said support, and means exteriorly of the vessel for heating the water in the water vessel.

2. An attachment for the purpose described comprising a hollow element having a casing supporting member, and adapted to be filled with water, means for applying heat to the exterior of the hollow element, and an exhaust pipe for steam extending from said hollow element.

3. An attachment for the purpose described comprising a hollow element having a casing supporting member, and adapted to be filled with water, means for applying heat exteriorly of the hollow element, and an exhaust pipe for steam extending from said hollow element, said casing supporting member having a channel therein for reception of a casing back forming bar.

4. An attachment for the purpose described comprising a hollow casing support element, a water tank depending therefrom and in communication therewith, an exhaust pipe for steam in said hollow casing supporting elements, and means for applying heat exteriorly of the water tank.

5. An attachment for the purpose described comprising a hollow element having a casing supporting member, and adapted to be filled with water, means for applying heat to the hollow element, and an exhaust pipe for steam extending from said hollow element, said means for applying heat comprising electrical heating elements and means disposed exteriorly of the hollow element.

6. An attachment for the purpose described comprising a hollow element having a casing supporting member, and adapted to be filled with water, means for applying heat exteriorly of the hollow element, and an exhaust pipe for steam extending from said hollow element, said means for applying heat comprising electrical heating elements, and separate circuits arranged for the heating elements to maintain the desired heat as applied to the water in the tank.

JOHN J. BURKE.